United States Patent [19]

Frazier, Jr. et al.

[11] Patent Number: 5,246,072

[45] Date of Patent: Sep. 21, 1993

[54] METHOD FOR ENHANCING THE RECOVERY OF PETROLEUM FROM AN OIL-BEARING FORMATION USING A MIXTURE INCLUDING ANIONIC AND CATIONIC SURFACTANTS

[75] Inventors: Rawls H. Frazier, Jr.; Donald L. Kuehne; Willie Horn, Jr.; Jeremy Cantor, all of Richmond, Calif.

[73] Assignee: Chevron Research and Technology Company, San Francisco, Calif.

[21] Appl. No.: 744,895

[22] Filed: Aug. 14, 1991

[51] Int. Cl.$^5$ .............................................. E21B 43/22
[52] U.S. Cl. .................................... 166/273; 166/268; 166/305.1; 166/309; 252/8.554
[58] Field of Search ............... 166/268, 272, 273, 274, 166/275, 309.1, 309; 252/8.554

[56] References Cited

U.S. PATENT DOCUMENTS

| | | | |
|---|---|---|---|
| 3,648,772 | 3/1972 | Earlougher, Jr. | 166/273 |
| 3,811,505 | 5/1974 | Flournoy et al. | 252/8.554 X |
| 4,113,631 | 9/1978 | Thompson | 252/8.554 X |
| 4,495,995 | 1/1985 | Chen et al. | 166/273 |
| 4,609,044 | 9/1986 | Lau | 166/270 |
| 4,676,316 | 6/1987 | Mitchell | 166/273 X |
| 4,706,750 | 11/1987 | Buckles | 166/272 X |
| 4,836,281 | 6/1989 | Robin et al. | 166/272 |
| 4,923,009 | 5/1990 | Watkins | 166/272 |
| 5,074,358 | 12/1991 | Rendall et al. | 166/268 X |

OTHER PUBLICATIONS

Ross, Sydney, et al., *Colloidal Systems and Interfaces*, John Wiley & Sons, 1988, pp. 135–138.
Rosen, Milton J., *Surfactants and Interfacial Phenomena*, John Wiley & Sons, 1989, pp. 17–20.

*Primary Examiner*—George A. Suchfield
*Attorney, Agent, or Firm*—Burns, Doane, Swecker & Mathis

[57] ABSTRACT

A foam-forming composition comprising a mixture of at least one anionic surfactant and at least one cationic surfactant can effectively form a foam in a variety of formations including an oil-wet environment. In particular, this composition can be employed in a method which comprises at least periodically injecting a gas and this foam-forming composition into an oil-bearing formation to drive oil to a production well. In this composition, the ratio of the at least one anionic surfactant to the at least one cationic surfactant is selected so that the surfactants do not form substantial amounts of precipitate when mixed together. In certain environments, e.g., when the formation contains upwards of 20% total dissolved solids and/or a divalent metal ion concentration up to about 20,000 ppm, the composition can further contain at least one salt-tolerance additive, e.g., a nonionic surfactant.

29 Claims, No Drawings

METHOD FOR ENHANCING THE RECOVERY OF PETROLEUM FROM AN OIL-BEARING FORMATION USING A MIXTURE INCLUDING ANIONIC AND CATIONIC SURFACTANTS

BACKGROUND OF THE INVENTION

The present invention relates to a method for enhancing the recovery of petroleum from an oil-bearing formation. In particular, the invention relates to the use of a mixture of anionic surfactants, cationic surfactants and optionally, nonionic surfactants, in petroleum formations.

In the recovery of light oils (i.e., greater than 20° API) from reservoirs, the use of primary production techniques (i.e., use of only the initial formation energy to recover the crude oil), followed by the secondary technique of waterflooding, recovers only about 60 to 70% of the original oil present in the formation.

Moreover, the use of certain enhanced oil recovery (EOR) techniques is also known within the art. These techniques can be generally classified as either a thermally based recovery method, i.e., utilizing steam, or a gas-drive method that can be operated under either miscible or non-miscible conditions.

The gases which are commonly employed in gas-drive methods include for example, nitrogen, carbon dioxide, methane, mixtures of methane with ethane, propane, butane, and higher hydrocarbon homologues. This class of gases includes both natural gas and produced gas.

A typical procedure involves injecting a slug of $CO_2$ followed by the injection of a higher viscosity fluid such as water to "push" the $CO_2$. See, for example, the discussion in U.S. Pat. No. 2,623,596. Moreover, U.S. Pat. No. 3,065,790 indicates that this process may be more cost effectively employed if a relatively small slug of $CO_2$ is injected ahead of a drive fluid. In fact, as illustrated by U.S. Pat. No. 3,529,668, this type of recovery procedure is typically performed in "water alternating gas (WAG)" cycles.

Because of the viscosity and density differences between the $CO_2$ and the oil (i.e., $CO_2$ has only 5 to 10% of the viscosity of ,e.g., light oil), the $CO_2$ tends to bypass much of the oil when flowing through the pores of the reservoir rock.

One proposed solution to this problem associated with the bypassing of the $CO_2$ has been through the injection of water which contains a surfactant, with the $CO_2$. In particular, a surfactant has been proposed as a means for generating a foam or an emulsion in the formation. See, for example, U.S. Pat. No. 4,380,266 to Wellington and U.S. Pat. No. 5,502,538 to Wellington et al.

The purpose of this foam is to inhibit the flow of the $CO_2$ into that portion of the formation containing only residual oil saturation. In addition, the foam physically blocks the channels through which $CO_2$ is short-cutting.

When employing gases, the creation of an effective foam is very difficult because either the salt concentration of the water in the formation (connate or injected brine), the residual oil in the reservoir, or the chemical instability of surfactants tends to break the foam or even prevent the foam from forming.

One environment where the formation of a foam is particularly troublesome is that where the rock surfaces tend not be wetted by water, i.e., oil is instead adsorbed onto the rock surface, which also destabilize foams. These types of rocks are known as "oil-wet".

The need still exists for a surfactant composition which can be effectively employed in oil-wet environments, e.g., oil-wet sandstone, limestone and/or dolomite formations.

Furthermore, although both cationic and anionic surfactants are individually recognized in the art, they are not traditionally employed in combination because, when mixed, they form a salt complex which precipitates out of such a mixture, i.e., the two charged compounds combine to form a complex having decreased solubility.

SUMMARY OF THE INVENTION

The present invention is based upon the surprising discovery that a composition comprising a mixture of an anionic surfactant and a cationic surfactant can effectively form a foam in an "oil-wet" environment.

In particular, the present invention relates to a foam-forming composition and a method for recovering hydrocarbons from a formation during injection of a gas. This method comprises at least periodically injecting a gas and the foam-forming composition into a formation which can comprise, e.g., an "oil-wet" rock. This foam-forming composition comprises water, and effective foam-forming amounts of at least one anionic and at least one cationic surfactant, where the ratio of the at least one anionic surfactant to the at least one cationic surfactant is selected so that the surfactants do not form substantial amounts of a precipitate when mixed together. The method further comprises contacting the hydrocarbons in the formation with the foam and the gas so as to assist in the recovery of hydrocarbons.

In another aspect, when the formation contains, e.g., upwards of 20% total dissolved solids and/or a divalent metal ion concentration up to about 20,000 ppm, the composition can also contain at least one salt-tolerance additive, e.g., a nonionic surfactant, in an amount which is sufficient to provide tolerance to dissolved salts present in the formation.

Detailed Description of the Preferred Embodiments

The present invention relates to a method for enhancing the recovery from an oil-bearing formation, and in particular, an oil-wet formation comprising, e.g., sandstone, limestone and/or dolomite. The method utilizes a foam-forming composition which can be employed with a gas.

The foam-forming composition according to the present invention comprises a mixture of at least one anionic surfactant, at least one cationic surfactant and optionally at least one salt-tolerance additive, e.g., a nonionic surfactant.

One surfactant composition according to the present invention involves a mixture of the anionic surfactant with a cationic surfactant where the ratio of these components is selected so as to not form substantial amounts of precipitation when mixed together. In particular, the ratio of anionic surfactant to cationic surfactant falls within the range of about 10 1 to about 1:10. For example, one effective embodiment employs a ratio of about 4:1.

The anionic surfactants which can be employed in the present invention include those gas foamers recognized in the art such as alkanesulfonates alkarylsulfonates, alkyl diphenyl ether disulfonates, arylsulfonates, alpha-olefin sulfonates, petroleum sulfonates, alkylsulfates, alkylethersulfates, alkarylethersulfates, and sulfosuccinates. Preferred among these are alkanesulfonates, alkarylsulfonates, alkyl diphenyl ether disulfonates, arylsulfonates, alpha-olefin sulfonates, petroleum sulfonates, with alpha-olefin sulfonates, being more preferred.

The cationic surfactants employed in the present invention include those cationic gas foamers recognized in the art. Such compounds include those having the formula $$R_1-\underset{\underset{R_3}{|}}{\overset{\overset{R_2}{|}}{N^+}}-R_4 \; X^-$$

where X is a halogen or sulfate, $R_1$ is alkyl or alkaryl, preferably $C_6$–$C_{24}$ alkyl or mixtures thereof, $R_2$ is $C_1$–$C_4$ alkyl, and are selected from $C_1$–$C_4$ alkyl or $$(\underset{\underset{R_5}{|}}{CH_2CHO})_n H,$$

where n is 0–100, and $R_5$ is H, $CH_3$, or $CH_2CH_3$.

In the above formula, $R_1$ can, for example, be chosen from among fatty alkyls which are derived, e.g., from coconut and/or tallow oils.

Each of the surfactants employed in the present invention can be produced by methods which are known in the art and need not be described in detail here.

The foam-forming composition can be 100 percent active, i.e., composed solely of active components, or can be a dilute solution, i.e., where the surfactant is present in an amount as low as about 0.1 percent by weight. However, the foam-forming composition is preferably formed as a concentrate comprising an admixture of surfactants and water. In such concentrates, the active components typically are present in an amount of at least about 40% by weight.

In use, the concentrate is preferably diluted with additional water to a working strength of, for example, about 0.01 to about 1 weight % surfactants based on the total weight.

The water which can be effectively employed in the present invention (in both forming and diluting the concentrate) can include water from any natural source, including a brine ranging in concentration of dissolved solids up to about 20% by weight depending on the reservoir temperature and concentrate composition.

In one preferred embodiment, the anionic/cationic combination can be effectively employed in a reservoir brine or "oil field brine" containing about 0 to about 5% total dissolved solids, with a divalent metal ion concentration of from 0 to about 1000 ppm. Moreover, this composition is useful over a temperature range from, e.g., ambient to about 200° F.

In another embodiment of the present invention, a salt-tolerance additive, e.g., a nonionic surfactant, is added to the anionic/cationic foam-forming composition to provide adequate solubility when employed in environments having a total dissolved solids concentration greater than that discussed above, and/or higher concentrations of divalent metal ions.

This additive can be selected from those materials recognized in the art such as low molecular weight alkyl sulfonates, alkyl diphenyl ether disulfonates, and the like.

In addition, nonionic surfactants can be employed as the additive, which surfactants include any of those which are capable of providing brine tolerance to the resulting surfactant mixture. Suitable nonionic surfactants include polyethoxylated derivatives of alkanols, alkylphenols, amines, amineoxides and amides.

One example of such surfactants include polyethoxylated alkanols, e.g., polyethoxylated 2-alkanols. Such polyethoxylated 2-alkanols include:

$$R_1R_2CHO(CH_2CH_2O)_xH$$

where $R_1$ and $R_2$ are $C_1$–$C_{20}$ alkyl and x is 0–100, preferably 30–50. An example of such a surfactant is $C_{11-15}H_{23-31}O(CH_2CH_2O)_{40}H$.

This anionic/cationic/nonionic surfactant system is capable of being employed in an environment containing from 0 to about 20% total dissolved solids and a divalent metal ion concentration from 0 to about 20,000 ppm.

This embodiment involves providing a concentrate of anionic/cationic surfactants where the salt-tolerance additive is present in an effective amount to provide the desired degree of brine tolerance without the formation of a precipitate. For example, in the embodiment employing nonionic surfactants, suitable ratios of the anionic/cationic surfactant to the nonionic surfactant are in the range of about 50:1 to 1:1.

Moreover, effective ratios for the anionic:cationic:nonionic surfactants are dependent upon the particular surfactants selected, preferred ratios are often not near a "middle" ratio, i.e., 1:1:1. Instead, suitable ratios include 4:1:1 and 1:5:5, and depend on factors such as temperature and salinity.

The foam-forming compositions according to the present invention may also contain minor amounts of other surface active agents. For example, cosurfactants, such as amphoteric surfactants, as well as scale inhibitors, such as AOS dimers and chelating agents, may be present. The total amount of these additional surface active agents is preferably not greater than about 5% by weight of the other components of the mixture.

The gas which can be employed includes any of those known in the art e.g., carbon dioxide, nitrogen, methane, flue gas and the like or mixtures of hydrocarbons such as methane with any of ethane, propane, or butane, flue gas and the like.

The quality of foam produced in the present invention is not particularly critical and is, for example, typically from about 60 to about 95% quality foam.

It is to be understood by those skilled in the art that this composition can be used either in cyclic ("huff and puff") or drive recovery methods under either miscible or immiscible conditions.

In using the foam-forming composition for the enhanced recovery of petroleum products, the foam may either be preformed or formed "in situ" (e.g., through introduction of alternate slugs of gas and form-forming composition in the formation). In either method, any of the procedures recognized in the art for injecting a foam into a formation may be employed.

Surprisingly, the composition according to the present invention is capable of providing a foam which is stable in an oil-wet environment. This is even more surprising when one recognizes that cationic and anionic mixtures are believed to be ineffective due to their low solubility.

The following examples illustrate advantages which can be associated with the present invention understood to be illustrated and in no wise limitive.

EXAMPLES

EXAMPLE 1: FOAM PERFORMANCE OF ANIONIC/CATIONIC SURFACTANT SYSTEM

An oil-wet dolomite test core 3" long by ⅞" in diameter was mounted in a coreflood apparatus that has provisions for injecting fluids and gases into the core and can measure the pressure of the system at the inlet and the outlet of the core. The system was set to a base pressure of 400 psig and this back pressure was maintained at the outlet end of the core with a back pressure regulator. The core was first flushed with a brine solution composed of $Na_2SO_4$ (1.66 g/l), NaCl (6.03 g/l), $MgCl_2 \cdot 6H_2O$ (1.41 g/l) and $CaCl_2 \cdot 2H_2O$ (0.58 g/l) dissolved in water, then with crude oil. Brine was then injected alone at a rate equivalent to 100 ft/day until oil is no longer produced at the core outlet. This was followed by $CO_2$ and brine at the same rate until no further oil was produced. A surfactant solution, prepared by dissolving 5.26 g 40 % aqueous $C_{12}$ α-olefin sulfonate and 0.66 g 75% coco-$N^+$ $(CH_2CH_2OH)_2CH_3$ $Cl^-$/25% isopropanol in enough brine to make a 500 g solution, was then injected into the core with the $CO_2$. The pressure difference across the inlet and outlet of the core was recorded as a function of time. An increase in pressure across the core is indicative of foam formation. Results are tabulated in Table 1.

TABLE 1

| T (min) | P (psig) |
|---|---|
| Baseline* | 2.7 |
| 0 | 3.2 |
| 19 | 2.2 |
| 27 | 22.8 |
| 45 | 184.2 |
| 54 | 222.6 |
| 73 | 261.6 |
| 82 | 269.6 |
| 92 | 286.2 |
| 111 | 279.2 |
| 125 | 278.6 |
| 146 | 277.5 |
| 157 | 273.6 |
| 203 | 277.2 |

*Before starting surfactant injection

EXAMPLE 2: FOAM PERFORMANCE OF ANIONIC/CATIONIC/NONIONIC SYSTEM

An oil-wet dolomite test core 3" long by ⅞" in diameter was mounted in a coreflood apparatus that has provisions for injecting fluids and gases into the core and can measure the pressure of the system at the inlet and the outlet of the core. The system was set to a base pressure of 400 psig and this back pressure was maintained at the outlet end of the core with a back pressure regulator. The core was first flushed with a brine solution composed of $Na_2SO_4$ (1.66 g/l), NaCl (6.03 g/l), $MgCl_2 \cdot 6H_2O$ (1.41 g/l) and $CaCl_2 \cdot 2H_2O$ (0.58 g/l) dissolved in water, then with crude oil. Brine alone was then injected into the core at 0.86 ml/min until oil was no longer produced at the core outlet. While continuing brine injection at the same rate, $CO_2$ was then injected into the core at a rate equivalent to 81 ml/min at 1 atmosphere pressure until no further oil was produced. A surfactant solution, prepared by dissolving 0.5 wt % of concentrated surfactant (194.4 g 40% aqueous $C_{12}$ α-olefin sulfonate, 26.0 g 75% coco-$N^+$ $(CH_2CH_2OH)_2CH_3$ $Cl^-$ in isopropanol, 19.5 g $C_{11-15}H_{23-31}O(CH_2CH_2O)_xH$ avg. molecular weight 1960 and 10.1 g water) in brine, was then injected into the core with the $CO_2$. The pressure difference across the inlet and outlet of the core was recorded as a function of time. Results are tabulated in Table 2. An increase in pressure across the core is indicative of foam formation.

TABLE 2

| T (Hrs:min) | P (psig) |
|---|---|
| Baseline* | 5 |
| 56 | 45 |
| 206 | 84 |
| 336 | 108 |
| 444 | 128 |
| 556 | 154 |

*Before starting surfactant injection

EXAMPLE 3: BRINE COMPATIBILITY

Surfactant Stock Solutions 1 and 2 were made by combining the ingredients shown in Table 3.

A Divalent Cation Stock Solution was prepared by dissolving and diluting 18.34 g $CaCl_2 \cdot 2H_2O$ and 41.81/g $MgCl_2 \cdot 6H_2O$ to 100/g with deionized water.

Fourteen surfactant test mixtures were prepared. Each contained 0.5 wt % total surfactants.

Test mixtures 1-11 were prepared by mixing the ingredients shown in Table 4 and adding deionized water until the combined weight was the value shown in the "Water to Make" column.

Test mixtures 12-14 were prepared by mixing equal volumes of Surfactant Stock Solution 2 and the respective brine shown in Table 5. The brine solutions were made by mixing the salts shown in the table with deionized water until the combined weight was the value shown in the "Water to Make" column of Table 5.

Test mixture 15 was prepared by mixing the ingredients shown in Table 6. The surfactants were dissolved in the NaCl solution. The calcium chloride then was added. Finally, deionized water was added until the combined weight was the value shown in the "Water to Make" column of Table 6.

After preparation, test mixtures 1-15 were allowed to stand for at least one day and then visually rated. The smaller the rating number, the more compatible the surfactant mixture is with the brine. Results are tabulated in Table 7.

TABLE 3

| Surfactant Stock Solution | ingredient | | | |
|---|---|---|---|---|
| | Anionic[1] (g) | Cationic[2] (g) | Nonionic[3] (g) | Water to[4] make (g) |
| 1 | 38.9 | 5.2 | 3.9 | 50 |
| 2 | 1 | .133 | — | 50 |

[1]40% aqueous $C_{12}$ α-olefin sulfonate
[2]75% COCO—$N^+(CH_2CH_2OH)_2CH_3Cl^-$ in isopropanol
[3]$C_{11-15}H_{23-31}O(CH_2CH_2O)_xH$ (avg. molecular weight 1960, x ≈ 40)
[4]Combined weight of mixture after water added

TABLE 4

| Test Mixture | TDS (%) | Hardness[1] (ppm) | NaCl (g) | Divalent Stock Solution (g) | Surfactant Stock Soln. 1 (g) | Water to Make (g) |
|---|---|---|---|---|---|---|
| 1 | 15 | 0 | 15 | 0 | 1.07 | 100 |
| 2 | 15 | 1000 | 14.67 | 1 | 1.07 | 100 |
| 3 | 15 | 5000 | 6.67 | 2.5 | 0.54 | 50 |
| 4 | 10 | 1000 | 4.83 | 0.5 | 0.54 | 50 |

TABLE 4-continued

| Test Mixture | TDS (%) | Hardness[1] (ppm) | NaCl (g) | Divalent Stock Solution (g) | Surfactant Stock Soln. 1 (g) | Water to Make (g) |
|---|---|---|---|---|---|---|
| 5 | 10 | 5000 | 4.16 | 2.5 | 0.54 | 50 |
| 6 | 10 | 10000 | 3.33 | 5.0 | 0.54 | 50 |
| 7 | 10 | 20000 | 1.66 | 10.0 | 0.54 | 50 |
| 8 | 5 | 1000 | 2.33 | 0.5 | 0.54 | 50 |
| 9 | 5 | 5000 | 1.66 | 2.5 | 0.54 | 50 |
| 10 | 5 | 10000 | 0.83 | 5.0 | 0.54 | 50 |
| 11 | 5 | 15000 | 0.0 | 7.48 | 0.54 | 50 |

[1]Concentration of divalent metal ions

TABLE 5

| Mixture | TDS[1] (%) | Hardness[2] (ppm) | NaCl (g) | $CaCl_2 \cdot 2H_2O$ (g) | $MgCl_2 \cdot 6H_2O$ (g) | Water to Make (g) |
|---|---|---|---|---|---|---|
| 12 | 0.4 | 1000 | 0.33 | 0.92 | 2.09 | 250 |
| 13 | 0.8 | 1000 | 2.33 | 0.92 | 2.09 | 250 |
| 14 | 2.0 | 1000 | 8.33 | 0.92 | 2.09 | 250 |

[1]After mixing with Surfactant Stock Solution 2
[2]Concentration of divalent metal ions

TABLE 6

| Test Mixture | TDS (%) | Hardness[1] (ppm) | Anionic[2] (g) | Cationic[3] (g) | Nonionic[4] | NaCl[5] (g) | $CaCl_2 \cdot 2H_2O$ (g) | Water to Make (g) |
|---|---|---|---|---|---|---|---|---|
| 15 | 21 | 7600 | 0.12 | 0.31 | 0.23 | 75.2 | 2.78 | 100 |

[1]Concentration of divalent metal ions
[2]40% aqueous $C_{12}$ α-olefin sulfonate
[3]75% COCO—$N^+(CH_2CH_2OH)_2CH_3Cl^-$ in isopropanol
[4]$C_{11-15}H_{23-31}O(CH_2CH_2O)_xH$ (avg. molecular weight 1960, x ≈ 40)
[5]25% aqueous solution

TABLE 7

| Test | Rating[1] |
|---|---|
| 1 | 1 |
| 2 | 2 |
| 3 | 5 |
| 4 | 2 |
| 5 | 2 |
| 6 | 3 |
| 7 | 3 |
| 8 | 1 |
| 9 | 2. |
| 10 | 2 |
| 11 | 3 |
| 12 | 5 |
| 13 | 5 |
| 14 | 1+ |
| 15 | 1+ |

[1]Rating scale:
1 clear
2 barely visible haze
3 faint haze
4 cloudy
5 separated into 2 or more phases
*Slight amount of solid observed While this invention has been described in terms of various preferred embodiments, the skilled artisan will appreciate that various modifications, substitutions, omissions and changes may be made without departing from the true spirit thereof. Accordingly, it is intended that the scope of the present invention be limited solely by the scope of the following claims including equivalents thereof.

We claim:

1. A method for recovering hydrocarbons from a formation comprising at least periodically injecting a gas and a foam-forming composition into a formation which includes an oil wet rock so as to provide a foam, wherein said composition comprises water, and effective foam-forming amounts of at least one cationic and at least one anionic surfactant, where the ratio of the at least one anionic surfactant to the at least one cationic surfactant is selected such that the surfactants do not form substantial amounts of precipitate when mixed together; contacting the hydrocarbons in the formation with the foam and the gas so as to assist in the recovery of hydrocarbons.

2. The method according to, claim 1 wherein the oil-bearing formation comprises dolomite.

3. The method of claim 1, wherein the formation comprises sandstone, limestone, dolomite, or mixtures thereof.

4. The method of claim 3 wherein the hydrocarbons comprise light oil.

5. The method of claim 1 wherein the at least one anionic surfactant is selected from among alkanesulfonates, alkarylsulfonates, alkyl diphenyl ether disulfonates, arylsulfonates, alpha-olefin sulfonates, petroleum sulfonates, alkylsulfates, alkylethersulfates, alkarylethersulfates, and sulfosuccinates.

6. The method according to claim 1 wherein the at least one anionic surfactant comprises an alpha-olefin sulfonate.

7. The method according to claim 6 wherein the alpha-olefin sulfonate comprises a $C_{12}$ alpha-olefin sulfonate.

8. The method according to claim 1 wherein the cationic surfactant is selected from among the compounds represented by

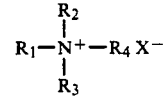

wherein X is a halogen or sulfate, $R_1$ is alkyl or alkaryl; $R_2$ is $C_1$–$C_4$ alkyl, $R_3$ and $R_4$ are selected from among $C_1$–$C_4$ alkyl or

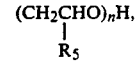

were n is 0–100 and $R_5$ is H, $CH_3$ or $CH_2CH_3$.

9. The method of claim 8 wherein $R_1$ is a $C_6$–$C_{24}$ alkyl or a mixture thereof.

10. The method of claim 8 wherein $R_1$ is selected from among fatty alkyls derived from coconut and/or tallow oils.

11. The method of claim 10 wherein $R_1$ is derived from coconut oil, $R_2$ is methyl, $R_3$ and $R_4$ are $C_2H_5OH$ and X is $Cl^-$.

12. The method according to claim 1 wherein the ratio of the at least one anionic surfactant to the at least one cationic surfactants is in the range of about 10:1 to about 1:10.

13. The method according to claim 12 wherein the at least one anionic surfactant is selected from among alkanesulfonates, alkarylsulfonates, alkyl diphenyl ether disulfonates, arylsulfonates, alpha-olefin sulfonates, petroleum sulfonates, alkylsulfates, alkylethersulfates, alkarylethersulfates, and sulfosuccinates and the cationic surfactant is selected from among the compounds represented by

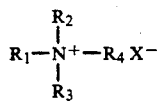

wherein X is halogen or sulfate, $R_1$ is alkyl or alkaryl; $R_2$ is $C_1-C_4$ alkyl, $R_3$ and $R_4$ are selected from among $C_1-C_4$ alkyl or

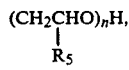

where n is 0-100 and $R_5$ is H, $CH_3$ or $CH_2CH_3$.

14. The method according to claim 1 wherein the ratio of the at least one anionic surfactant to the at least one cationic surfactant is about 4:1.

15. The method according to claim 1 wherein the formation contains a brine having a total dissolved solids of from 0 to about 5% by weight and a calcium ion concentration of from 0 to about 1000 ppm.

16. The method according to claim 1 wherein the composition further comprises at least one salt-tolerance additive in an amount which is effective to provide tolerance to dissolved salts in the formation.

17. The method of claim 1 wherein the salt-tolerance additive comprises a nonionic surfactant.

18. The method of claim 17 wherein the at least one nonionic surfactant is selected from among polyethoxylated derivatives of alkanols, alkylphenols, amines, amineoxides, amides or mixtures thereof.

19. The method according to claim 18 wherein the at least one anionic surfactant is selected from among alkanesulfonates, alkarylsulfonates, alkyl diphenyl ether disulfonates, arylsulfonates, alpha-olefin sulfonates, petroleum sulfonates, alkylsulfates, alkylethersulfates, alkarylethersulfates, and sulfosuccinates and the cationic surfactant is selected from among the compounds represented by

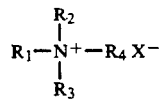

where X is a halogen or sulfate, $R_1$ is alkyl or alkaryl; $R_2$ is $C_1-C_4$ alkyl, $R_3$ and $R_4$ are selected from among $C_1-C_4$ alkyl or

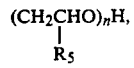

where n is 0-100 and $R_5$ is H, $CH_3$ or $CH_2CH_3$.

20. The method according to claim 17 wherein the at least one nonionic surfactant is selected from polyethoxylated alkanols.

21. The method according to claim 20 wherein the nonionic surfactant is selected from polyethoxylated 2-alkanols.

22. The method according to claim 20 wherein the nonionic surfactant is $C_{11-15}H_{23-31}O(CH_2CH_2O)_{40}H$.

23. The method according to claim 17 wherein the formation contains from about 0 to about 15% total dissolved solids and a divalent metal ion concentration from about 0 to about 20,000 ppm.

24. The method according to claim 17 wherein the ratio of anionic/cationic surfactant to nonionic surfactant(s) is about 50:1 to about 1:1.

25. The method according to claim 24 wherein the ratio of anionic:cationic:nonionic surfactant is about 4:1:1.

26. The method according to claim 24 wherein the ratio of anionic:cationic:nonionic surfactants is about 1:5:5.

27. The method according to claim 24 wherein the at least one anionic surfactant is selected from among alkanesulfonates, alkarylsulfonates, alkyl diphenyl ether disulfonates, arylsulfonates, alpha-olefin sulfonates, petroleum sulfonates, alkylsulfates, alkylethersulfates, alkarylethersulfates, and sulfosuccinates and the cationic surfactant is selected from among the compounds represented by

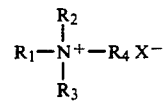

wherein X is a halogen or sulfate, $R_1$ is alkyl or alkaryl; $R_2$ is $C_1-C_4$ alkyl, $R_3$ and $R_4$ are selected from among $C_1-C_4$ alkyl or

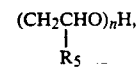

where n is 0-100 and $R_5$ is H, $CH_3$ or $CH_2CH_3$.

28. The method according to claim 1 wherein the mixture contains about 0.1-1% by weight of surfactants.

29. The method according to claim 1 wherein the at least one anionic surfactant is selected from among alkanesulfonates, alkarylsulfonates, alkyl diphenyl ether disulfonates, arylsulfonates, alpha-olefin sulfonates, petroleum sulfonates, alkylsulfates, alkylethersulfates, alkarylethersulfates, and sulfosuccinates and the cationic surfactant is selected from among the compounds represented by

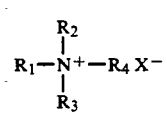

wherein X is a halogen or sulfate, $R_1$ is alkyl or alkaryl; $R_2$ is $C_1-C_4$ alkyl, $R_3$ and $R_4$ are selected from among $C_1-C_4$ alkyl or

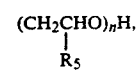

where n is 0-100 and $R_5$ is H, $CH_3$ or $CH_2CH_3$.

* * * * *